United States Patent
Jochim et al.

(10) Patent No.: US 10,552,537 B2
(45) Date of Patent: Feb. 4, 2020

(54) COGNITIVE INITIALIZATION OF LARGE-SCALE ADVECTION-DIFFUSION MODELS

(71) Applicant: INTERNATIONAL BUSINESS MACHINES CORPORATION, Armonk, NY (US)

(72) Inventors: Charles A. Jochim, Dublin (IE); Fearghal O'Donncha, Galway (IE); Emanuele Ragnoli, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 426 days.

(21) Appl. No.: 15/337,495

(22) Filed: Oct. 28, 2016

(65) Prior Publication Data
US 2018/0121389 A1    May 3, 2018

(51) Int. Cl.
| G06F 7/60 | (2006.01) |
| G06F 17/10 | (2006.01) |
| G06F 17/27 | (2006.01) |
| G06N 20/00 | (2019.01) |

(52) U.S. Cl.
CPC ......... *G06F 17/2765* (2013.01); *G06N 20/00* (2019.01); *G06F 2217/16* (2013.01)

(58) Field of Classification Search
None
See application file for complete search history.

(56) References Cited

U.S. PATENT DOCUMENTS

| 6,886,010 | B2 | 4/2005 | Kostoff | |
| 8,121,668 | B2 | 2/2012 | Sutton et al. | |
| 9,514,256 | B1* | 12/2016 | Kolar | G06F 17/5009 |
| 10,192,031 | B1* | 1/2019 | Walker | G06F 19/321 |
| 2009/0265151 | A1* | 10/2009 | Zhang | G06F 17/5018 703/2 |
| 2012/0095738 | A1 | 4/2012 | Saito et al. | |
| 2012/0323118 | A1 | 12/2012 | Menon Gopalakrishna et al. | |
| 2015/0007202 | A1* | 1/2015 | Doerpmund | G06F 9/54 719/328 |
| 2017/0024647 | A1* | 1/2017 | Cheong | G06F 17/50 |
| 2017/0251985 | A1* | 9/2017 | Howard | A61B 5/7282 |

OTHER PUBLICATIONS

Jatmiko, Wisnu et al., "A PSO-Based Mobile Robot for Odor Source Localization in Dynamic Advection-Diffusion with Obstacles Environment: Theory, Simulation and Measurement", May 2007, IEEE Computational Intelligence Magazine, IEEE. (Year: 2007).*

(Continued)

*Primary Examiner* — Cedric Johnson
(74) *Attorney, Agent, or Firm* — Intelletek Law Group, PLLC; Gabriel Daniel, Esq.

(57) ABSTRACT

A computer system, method, and computer readable product are provided for cognitive initialization of large-scale advection-diffusion models. In various embodiments, parameters are identified for configuring an advection-diffusion model to be run. Then a natural language processing search is conducted for these parameters in relevant literature to find corresponding numerical values. These search results are compared, and values for the parameters are set for the advection-diffusion model, and the model is run.

17 Claims, 5 Drawing Sheets

(56) References Cited

OTHER PUBLICATIONS

Maryshev, Boris et al., "Accuracy and Efficiency of Adjoint State Based Parameter Identification for Fractional Advection Diffusion Equation with Space-Dependent Coefficients", Apr. 6-8, 2016, CoDIT'16. (Year: 2016).*
Schuster, Daniel et al., "NL Sampler—Random Sampling of Web Documents on Natural Language with Query Hit Estimation", Mar. 11-15, 2007, SAC'07, ACM (Year: 2007).*
Anonymous, "Cognitive Computing Based Smart Design Option Tool," ip.com, Sep. 22, 2015.
Anonymous, "Cognitive Computing Based Smart Prior Art Search," ip.com, Sep. 22, 2015.
Anonymous, "Self-Diagnosing Natural Language QA System That Improves Itself Based on Facial Feature Tracking," ip.com, Jun. 5, 2015.
Grunbaum, D., "Advection-Diffusion Equations for Internal State-Mediated Random Walks," SIAM Journal on Applied Mathematics, vol. 61, No. 1, pp. 43-73, AN-6682879, Jan. 2000.

\* cited by examiner

COGNITIVE INITIALIZATION OF LARGE-SCALE ADVECTION-DIFFUSION MODELS

BACKGROUND

Advection is the transport of a substance, such as a fluid. Diffusion is the process whereby molecules move. An advection-diffusion model, then, describes physical phenomena where particles, energy, or other physical quantities are transferred inside a physical system as a result of advection and diffusion. There are computer-based advection-diffusion models that can be used to model advection-diffusion, such as the movement of salt within a river, or bubbles in a lake as they move toward the lake's surface.

SUMMARY

In various embodiments, a computing device that implements an embodiment of the present disclosure determines a first parameter for which a first numerical value is to be determined. Then, the computing device performs a natural language processing (NLP) search for a plurality of numerical values for the first parameter on a set of documents. The computing device then selects the first numerical value from the plurality of numerical values.

Having selected the first numerical value for the first parameter, the computing device performs an advection-diffusion model using that first numerical value for that first parameter. The computing device then stores a result of performing the advection-diffusion model in a computer memory.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
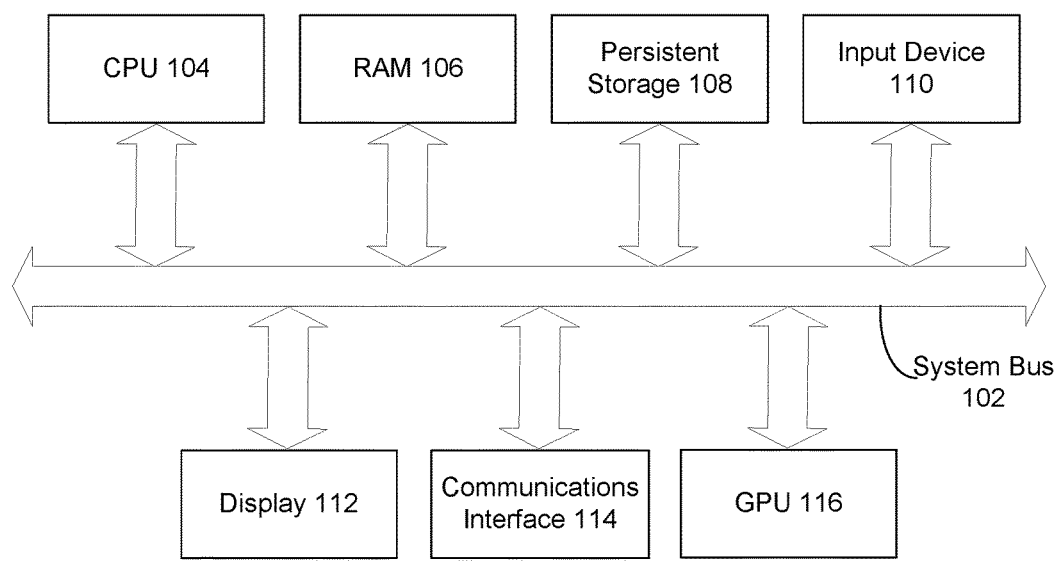
FIG. 1 illustrates examples of hardware used according to embodiments of the present disclosure.

Detailed embodiments of the claimed structures and methods are disclosed herein. However, it may be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

An advection-diffusion model may be modeled based on user-defined criteria, or parameters, such as viscosity coefficients, diffusivity coefficients or wall roughness coefficients. In the past, a user has typically needed to manually specify the user-defined coefficients for the model, and configure the model. A problem with the user manually specifying coefficients for, and configuring, an advection-diffusion model is that doing so is complex. Another problem with the user manually specifying coefficients for, and configuring, an advection-diffusion model is that it generally requires some level of expertise from the user to know what values to set for the criteria. It would therefore be an improvement to automate the process of specifying coefficients for, and configuring, an advection-diffusion model.

The present disclosure involves a system that may select appropriate model coefficients based on literature, and other sources, so that users do not have to manually select these coefficients, and makes autonomous deployment feasible. In this disclosure, a cognitive compute model may connect characteristic descriptors to structured or unstructured data sources that contain information on other comparable model studies. A decision-management module may select an appropriate model set-up configuration (such as model coefficients) based on values from comparable deployments.

In contrast, in prior techniques, a user hand-selects parameters. Then, model parameters may be fine-tuned at initialization based on comparing an output of the advection-diffusion model against measurements, and adjusting parameters until an acceptable fit is achieved with selected parameters. Parameter fine-tuning may be either performed manually, or be data-driven, such as via Monte Carlo techniques, adjoint/inverse techniques, design of experiment (DOE) techniques, or PEST-style techniques (which may be based on a Levenberg-Marquardt algorithm, and may include Tikhonov regularization). To do data-driven parameter fine-tuning is computationally expensive, and generally impractical for large-scale advection-diffusion models.

Then, in contrast to these prior techniques, the present disclosure provides for automatic selection of model parameters based on literature, an ability to easily transport a given advection-diffusion model to another case study, and a confidence measure of selected parameters based on their impact in academic literature.

The present disclosure involves a parameter characterization model that collates information on an advection-diffusion model such as geographical location, climate, or grid resolution; a natural language processing (NLP) module that discovers and evaluates potential answers that relate model parameter classification to other comparable model deployments in unstructured sources by using information retrieval to find relevant natural language documents and entity and relation extraction to identify model parameters and their associated values in text; and a decision-management module to select a final parameterization based on values from comparable studies and a pertinent performance score (e.g., a number of times that a value has been mentioned in the literature, or a value's impact as measured by citations).

This disclosure may be useful in aiding a user in the tedious, time-consuming, and possibly error-prone process of setting up and initializing a large-scale advection-diffusion model. Additionally, this disclosure may remove a dependency on having a skilled user to set up and initialize an advection-diffusion model. And, this disclosure may allow for an autonomous deployment of an advection-diffusion model.

The NLP module may conduct a search of pertinent documents (such as those from GOOGLE's Scholar academic literature search service) for specific keywords (e.g., "radiation attenuation coefficients"), and extracts from corresponding documents a numerical value associated with the keywords to guide model parameterization. A NLP search of documents may involve addressing a complexity of natural language, such as sentence ambiguity, semantic knowledge, context knowledge, and retrieval of the correct information relative to the search term. The present disclosure may operate where the NLP module does not have a 100% success rate in matching keywords with numerical values. It may be that the present disclosure may operate where sufficient key-values are matched to allow a decision-management module to select an appropriate parameter. An approach to counteract having a less-than-100% success rate with matching keywords with numerical values is to search a large number of documents.

The present disclosure may be used for a variety of models. An example of a model that the present disclosure may be used for is a circulation model. Modeling a three-dimensional (3D) circulation process for a large body of water may be challenging and heavily reliant on an expert user to select appropriate initial conditions. Model coefficients may be defined in order to correctly replicate flow processes, including turbulence, bed-heating exchange, and solar radiation. These model coefficients are typically defined by an expert user based on experience and that user's search of the literature for comparable model deployments in terms of things like climate, selected resolution, and relevant process study. The present disclosure may eliminate this dependency on an expert user and a complex and tedious process.

Another example of a model that the present disclosure may be used for is a model of dispersion of pollutants. The tracking and forecasting of an oil spill in water may be performed with an advection-diffusion (or advection-diffusion-reaction) model that is parameter dependent. The prior process of parameterization for modeling dispersion of pollutants may be similar to the process described above with respect to the circulation model, in which a domain expert makes an educated guess on possible parameter settings and verifies models run with validation data.

And another example of a model that the present disclosure may be used for is a financial model. For example, when an explicit formula is unavailable, pricing a financial instrument over time may performed with a Black-Scholes model. By relaxing the assumptions of a Black-Scholes model (originally used to determine the price of a European-style call option), the model may be used in derivative pricing and risk management practices. Since a Black-Scholes model utilizes an assumption that the current derivative price follows a geometric Brownian motion, and since the Einstein relation relates Brownian motion with the diffusion equation, a Black-Scholes model may be interpreted as a diffusion-dominated advection-diffusion model. Then, a parameter to be tuned (which cannot be observed in the market) is the average future volatility of the underlying asset. The disclosure could then be used to guide a selection of a volatility model based on prevailing literature on how to estimate volatility depending on the underlying asset and market conditions.

As used herein, elements of the disclosure may be referred to as utilizing cognitive aspects because they utilize cognitive computing principles. For example, natural language processing of unstructured documents may be considered to be one of a broad class of cognitive computing principles.

FIG. 1 illustrates examples of hardware used according to embodiments of the present disclosure. As shown in FIG. 1, a block diagram illustrates examples of computer hardware that may be used according to embodiments of the present disclosure for cognitive initialization of large-scale advection-diffusion models. CPU (central processing unit) 104, RAM (random access memory) 106, persistent storage 108, input device 110, display 112, communications interface 114, and GPU (graphics processing unit) 116 are connected to a system bus 102. It may be appreciated that system bus 102 is presented logically and simplified, and that two or more of these components may be communicatively coupled by one or more separate buses. It also may be appreciated that the depictions of CPU 104 and GPU 116 are simplified to emphasize the components that are depicted—for example they omit hardware that controls the flow of computer-executable instructions within them.

In FIG. 1, persistent storage 108, in an embodiment of the present disclosure, has capabilities that include storing a program that can execute the processes described herein. Persistent storage 108, in an embodiment of the present disclosure, can store an executing application that effectuates cognitive-initialization of large-scale advection-diffusion models, and executes computer-executable instructions in response to requests to initialize an advection-diffusion model.

Additionally, in FIG. 1, an input device 110, such as a keyboard and a mouse may be used to provide input to the computer hardware of FIG. 1. For example, this input may be made to request to initialize an advection-diffusion model, and to select one or more parameters of the advection-diffusion that are to be initialized.

In one embodiment, the communications interface 114 of FIG. 1 is connected to a communications network using a WiFi (wireless-fidelity) or LTE (long-term evolution) network communications protocol. Communications interface 114 may also comprise a network interface card (NIC) that is connected to a communications network via an Ethernet cable. In the present disclosure, communications interface 114 may be used to perform natural language processing (NLP) on one or more stores of documents that are stored on external computers to find corresponding numerical values for parameters of an advection-diffusion model. These external computers may be accessible via a communications network. Communications interface 114 may also be used to communicate with other computers that are used to process an advection-diffusion model, where that advection-diffusion model is processed with a distributed computing architecture that comprises multiple computers.

In the present disclosure, communications interface 114 may receive processing requests in accordance with a communication protocol, for example TCP/IP (Transmission Control Protocol/Internet Protocol), from another computer (not shown), and processing results are sent to a third computer (not shown). As depicted, communications interface 114 may comprise hardware for transmitting and receiving network data, and/or processor-executable instructions for doing the same.

Figure 2:
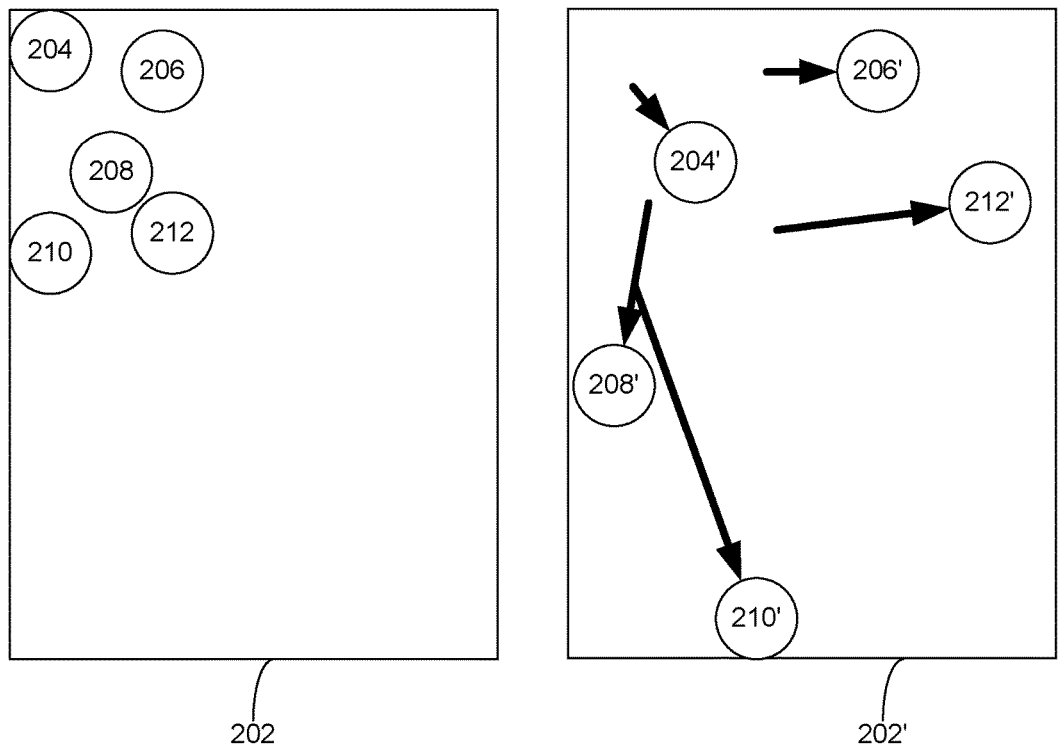
FIG. 2 illustrates an example of advection-diffusion that may be modeled according to embodiments of the present disclosure.

FIG. 2 illustrates an example of advection-diffusion that may be modeled according to embodiments of the present disclosure. In some embodiments, the advection-diffusion of FIG. 2 may be modeled on the computer hardware of FIG. 1 as that computer hardware implements the processes of FIGS. 3-5 for cognitive initialization of large-scale advection-diffusion models.

As depicted, there is a mass of fluid (such as water) and the fluid contains five masses (such as oil molecules). Fluid 202 depicts this arrangement at an initial time, and then fluid 202' depicts this same mass of fluid containing five molecules as some later time. These five molecules are depicted as molecule 204, molecule 206, molecule 208, molecule 210, and molecule 212 in fluid 202, and then molecule 204', molecule 206', molecule 208', molecule 210', and molecule 212' in fluid 202'.

It is through a process of advection-diffusion that these five molecules move between the initial time of fluid 202 and the later time of fluid 202', and this advection-diffusion can be modeled on a computer-based system using the present disclosure. For example, between the initial time of fluid 202 and the time depicted in fluid 202', each of the five molecules changes its position within the fluid. This change of position is depicted with a vector arrow, though it may be appreciated that that this vector merely represents the positional change between the two times, and the molecules may have taken a non-linear path between the two positions.

It may also be appreciated that the molecules do not necessarily all move according to the same vector. For example, molecule 208' has moved a relatively shorter distance as well as to the left along the X-axis, while molecule 210' has moved a relatively longer distance as well to the right along the X-axis. And while both of those molecules have generally moved down along the Y-axis, molecule 212' has generally moved up along the Y-axis.

While advection-diffusion process depicted between fluid 202 and fluid 202' is simplified (depicting five molecules at two different points in time), it may be appreciated that far more complex advection-diffusion may be modeled according to the present disclosure, for instance containing many more molecules at many more times. And these more-complex advection-diffusion models may involve many parameters, such as a geographical location, a regional climate, a time or time of the year when the model occurs, and a resolution of the model (i.e., how precise of a decision measurement is made in modeling the positions of the various elements of the advection-diffusion model). For a user to manually identify each of these parameters may be both time consuming, and require a high level of expertise to both identify the parameters themselves, and then also specify values for those parameters. This time consuming and complex process may be reduced, according to the present disclosure.

Figure 3:
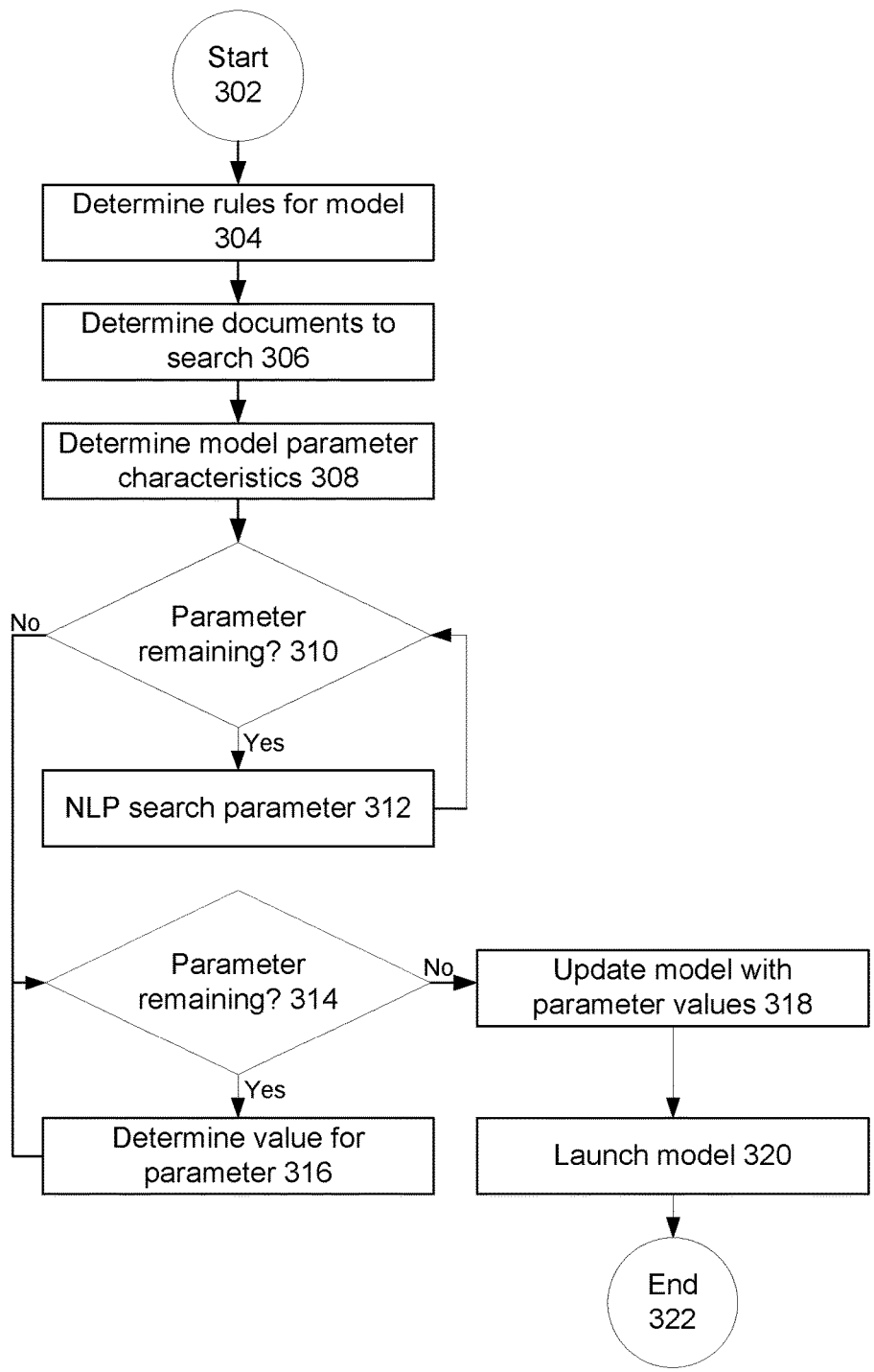
FIG. 3 illustrates an example process for cognitive initialization of large-scale advection-diffusion models.

FIG. 3 illustrates an example process for cognitive initialization of large-scale advection-diffusion models. In some embodiments, the operations of FIG. 3 may be implemented on the computer hardware of FIG. 1 to model advection-diffusion.

It may be appreciated that the process of FIG. 3 is an example process, and that there may be embodiments that implement more or fewer operations than are disclosed. It may also be appreciated that there may be embodiments that implement the operations of FIG. 3 in a different order than they are depicted in FIG. 3.

It may further be appreciated that the operations of FIG. 3 may be implemented in conjunction with the operations of other figures. For example, the operations of FIG. 3 may be implemented in conjunction with the operations of FIG. 4, which may provide for a natural language processing search to find numerical values for parameters in initializing large-scale advection-diffusion models. In this situation, implementing the process of FIG. 4 may serve the role of implementing operations 310 and 312 of FIG. 3.

Figure 5:
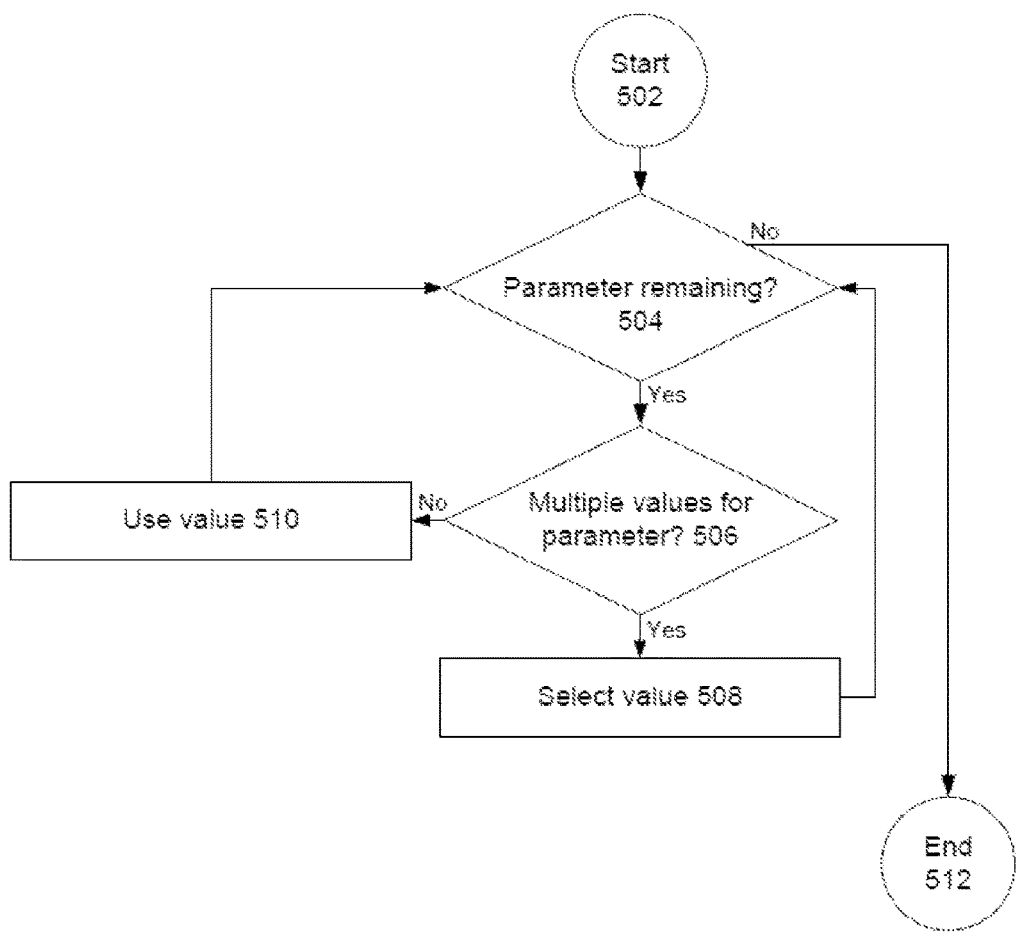
FIG. 5 illustrates an example process for determining a numerical value to utilize for a parameter to use in initializing large-scale advection-diffusion models from among a plurality of numerical values.

In one embodiment, the operations of FIG. 3 may be implemented in conjunction with the operations of FIG. 5, which may provide for determining a numerical value to utilize for a parameter to use in initializing large-scale advection-diffusion models from a plurality of numerical values. In this situation, implementing the operations of FIG. 5 may serve the role of implementing operations 314 and 316 of FIG. 3.

The operations of FIG. 3 may be implemented as a computer-implemented method for determining a first numerical value for a first parameter of a computer-based advection-diffusion model. The operations of FIG. 3 begin with operation 302 and then move to operation 304. Operation 304 depicts determining rules for the advection-diffusion model. In some embodiments, determining these rules may comprise receiving user input indicative of selection criteria, and tunable parameters.

Given an example of using an advection-diffusion model to model an ocean, these tunable parameters could include horizontal and vertical diffusion coefficients, solar radiation coefficients, and bed shear stress coefficients. After operation 304, the operations of FIG. 3 move to operation 306.

Operation 306 depicts determining documents to search. In some embodiments, there may be multiple sources of documents available to search. These sources may include structured sources like relational databases, as well as unstructured sources of natural-language documents like the GOOGLE SCHOLAR or MICROSOFT ACADEMIC data sources. In some embodiments, the documents to search may be determined in response to receiving user input indicative of which sources of documents to search.

In other embodiments, the sources of documents to search may be determined based on known parameters of the advection-diffusion model to be performed, such as where the model involves financial markets, and where certain document sources are considered to have high quality information on financial market modeling. In other embodiments, the sources of documents to be searched may be determined based on whether there is a monetary charge or permissions associated with accessing a particular source. For example, it may cost money or require a user account to access a particular source, and where a budget for a particular advection-diffusion model does not allow for paying money for a source, or where a user account for a source is not possessed, that source may be omitted from searching. After operation 306, the operations of FIG. 3 move to operation 308.

Operation 308 depicts determining model parameter characteristics. An advection-diffusion model may define descriptors of the process being modeled on a defined set of features, such as geographical location, regional climate, a time of year, and domain-specific classifications. For example, determining model parameter characteristics may involve a computer that implements the model prompting a user to provide input to a computer to define these model parameter characteristics. Determining model parameter characteristics may also include determining which parameters are to have a value determined using a NLP search. In some embodiments, operation 308 may comprise determining a first parameter for which a first numerical value is to be determined.

Returning to the example of modeling an ocean using the present disclosure as described with respect to operation 304, a user may respond to a series of prompts from a computer regarding grid resolution, the historical climate, and local geology. This information may then be used to guide parameter selection by associating (1) grid resolution with horizontal and vertical diffusivity coefficients, (2) regional climate with solar radiation coefficients, and (3) geology with bed shear stress coefficients. After operation 308, the operations of FIG. 3 move to operation 310.

Operation 310 depicts determining whether there is a parameter remaining. The parameters in question may be the parameters for the advection-diffusion model that are to have a value determined that are identified in operation 308. In some embodiments, the parameters determined in operation 308 may be stored in a list, or other data structure. Then, the list may be traversed, with one parameter being considered at a time for operation 312, until each parameter has been analyzed with respect to operation 312. So, where there is still a parameter in the list that has not been examined in operation 312, then it may be determined that there is a parameter remaining, and where the end of the list of parameters is reached, it may be determined that there is not a parameter remaining.

If it is determined in operation 310 that there is a parameter remaining, the operations of FIG. 3 move to operation 312. Instead, if it is determined in operation 310 that there is not a parameter remaining, the operations of FIG. 3 move to operation 314.

Operation 312 is reached from operation 310 where, in operation 310, it is determined that there is a parameter remaining. Operation 312 depicts performing a NLP search on the parameter. In some embodiments, operations 312 may be implemented in a similar manner as operations 412, 414, and 416 of FIG. 4.

In some embodiments, operation 312 may comprise performing a NLP search for a plurality of numerical values for a first parameter on a plurality of documents. In some embodiments, operation 312 may be performed for a given parameter until a threshold number of results are found, and may comprise halting performing the NLP search when a predetermined number of numerical values for a first parameter have been found.

In some embodiments, performing a NLP search may comprise determining that a plurality of numerical values are associated with a first parameter based on performing a statistical classification on the plurality of numerical values in the plurality of documents. In some embodiments where it is an external source of documents that are accessed, operation 312 may comprise accessing the plurality of documents that are stored on a remote computer and accessed via a communications network.

In some embodiments, NLP searching may be trained to specifically identify values for parameters to be used in an advection-diffusion model, and may comprise, before performing the NLP search, training a component that performs the search with labeled documents.

Returning to the example of modeling an ocean with the present disclosure as described with respect to operations 304 and 308, documents stored in sources may be stored in an inverted index so that a Boolean query comprising the model characteristics (from the example in operation 308, (1) grid resolution, (2) regional climate, and (3) geology) may be performed to identify relevant documents. These documents may then be processed with an ocean-specific named-entity recognition tool comprising a supervised structured classifier (e.g., a conditional random field), which identifies parameter names and values.

The named-entity recognition tool may be trained a priori using labeled documents. There are multiple ways in which the named-entity recognition tool may be trained, such as via bootstrapping or external annotators. Additionally, a statistical classifier, such as a support vector machine, may be utilized to subsequently confirm parameter values that are associated with a given parameter.

After operation 312, the operations of FIG. 3 return to operation 310. In this manner, operations 310 and 312 may serve as a loop where a NLP search is performed on each parameter.

Operation 314 is reached from operation 310 where, in operation 310, it is determined that there is not a parameter remaining on which to perform a NLP search. Operation 314 depicts determining whether there is a parameter remaining to determine a numerical value for. After the loop of operations 310-312 is used to search for a value for each parameter, the loop of operations 314-316 may be used to determine a value for each of those parameters to be used in the advection-diffusion model (where the search may have returned multiple possible values for a given parameter). So, operation 314 may be implemented in a similar manner as operation 310, with a difference being what is done with each remaining parameter (in operation 312 it is to NLP search for the parameter, and in operation 316 it is to determine a value for the parameter).

If it is determined in operation 314 that there is a parameter remaining, the operations of FIG. 3 move to operation 316. Instead, if it is determined in operation 314 that there is not a parameter remaining, the operations of FIG. 3 move to operation 318.

Operation 316 is reached from operation 314 where, in operation 314, it is determined that there is a parameter remaining. Operation 316 depicts determining a numerical value for the parameter. In some embodiments, operation 316 may be implemented in a similar manner as operation 506, 508, and 510 of FIG. 5. In some embodiments, operation 316 may comprise selecting a first numerical value for a first parameter from the plurality of numerical values for the first parameter. After operation 316, the operations of FIG. 3 return to operation 314. In this manner, operations 314 and 316 may serve as a loop where a numerical value is determined for each parameter.

Operation 318 is reached from operation 314 where, in operation 314, it is determined that there is not a parameter remaining. Operation 318 depicts updating the advection-diffusion model with the numerical values for the parameters. Updating the advection-diffusion model with the numerical values for the parameters may comprise initializing the model, so that when it is run, it operates using those given numerical values for those given parameters. After operation 318, the operations of FIG. 3 move to operation 320.

Operation 320 depicts launching the advection-diffusion model. Launching the advection-diffusion model may comprise beginning to run the model on one or more computers (where the model may be run on a cluster computing architecture) to determine what happens in the model over time. In some embodiments where a first numerical value has been selected for a first parameter, operation 320 may comprise performing the advection-diffusion model using the first numerical value for the first parameter.

Where a result of launching and running the advection-diffusion model is to be stored, operation 320 may comprise storing a result of performing the advection-diffusion model in a computer memory. Then, where this stored result of performing the advection-diffusion model may be used in initializing future advection-diffusion models (such as by using a value for a parameter in this model as a value for a parameter in a future model, where the two models share similar characteristics), operation 320 may also comprise using the result of performing the advection-diffusion model to determine a second numerical value for a second parameter of a second advection-diffusion model. After operation 320, the operations of FIG. 3 move to operation 322, where the operations of FIG. 3 end.

Figure 4:
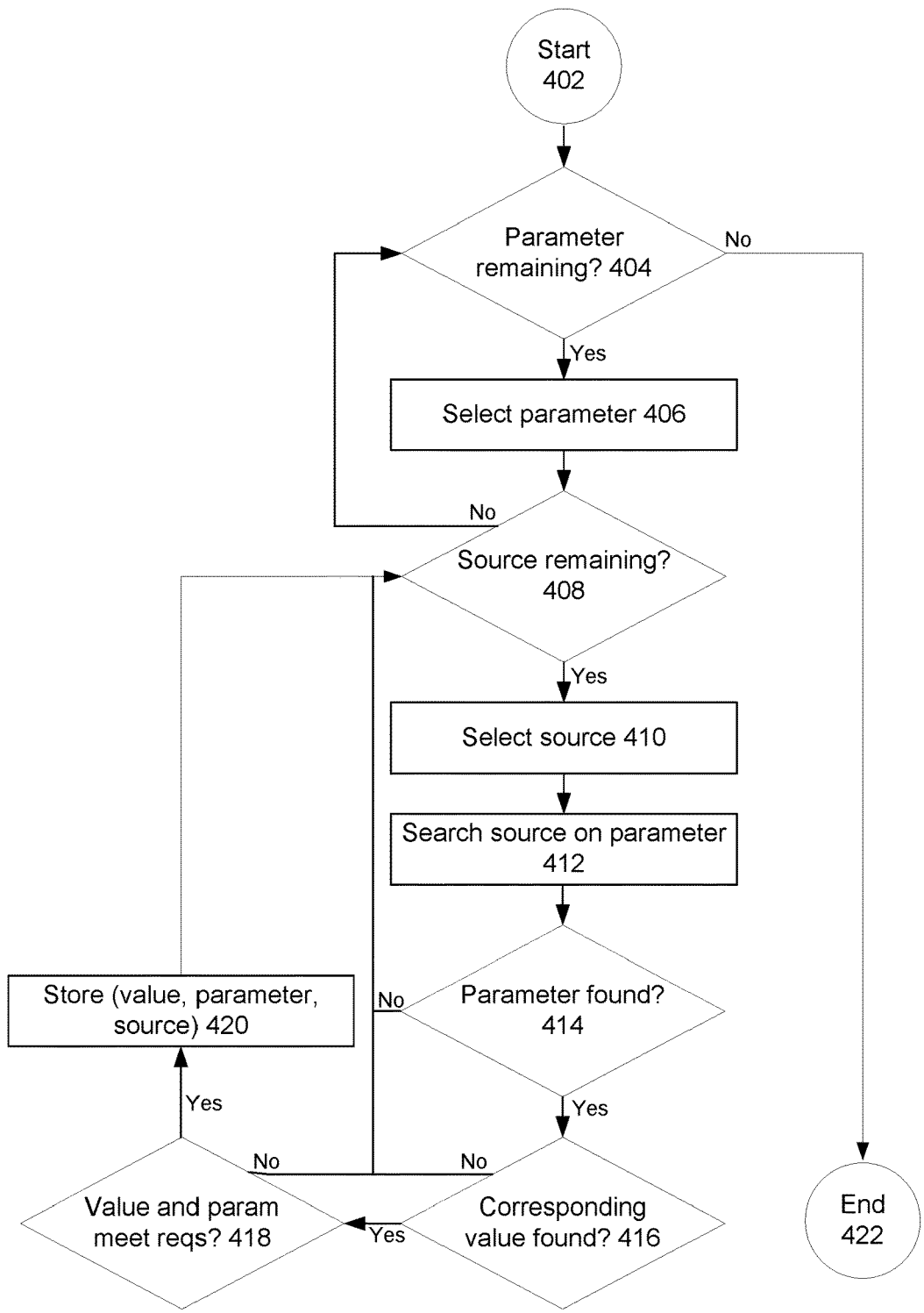
FIG. 4 illustrates an example process for performing a natural language processing (NLP) search to find numerical values for parameters in initializing large-scale advection-diffusion models.

FIG. 4 illustrates an example process for performing a natural language processing (NLP) search to find numerical values for parameters in initializing large-scale advection-diffusion models. In some embodiments, the operations of FIG. 4 may be implemented on the computer hardware of FIG. 1 to model advection-diffusion. It may be appreciated that the operations of FIG. 4 are example operations, and that there may be embodiments that implement more or fewer operations than are disclosed. It may also be appreciated that there may be embodiments that implement the operations of FIG. 4 in a different order than they are depicted in FIG. 4.

The operations of FIG. 4 begin with operation 402 and then move to operation 404. Operation 404 depicts determining if there is a parameter remaining. When the parameters for which values are to be determined are identified, they may be stored in a list, or other data structure. Then, the list may be traversed. Where there is still an un-examined parameter in the list, it may be determined that there is a parameter remaining. And where the list has been fully traversed, it may be determined whether there is not a parameter remaining.

If in operation 404 it is determined that there is a parameter remaining, then the operations of FIG. 4 move to operation 406. Instead, if in operation 404 it is determined that a parameter is not remaining, then the operations of FIG. 4 move to operation 422, where the operations of FIG. 4 end.

It may be appreciated that operation 404 serves as the origin of a loop through the majority of the operations of FIG. 4 to search for numerical values for each parameter of an advection-diffusion model for which parameters are to be determined according to the operations of FIG. 4. Then, there is a sub-loop, originating on operation 408, where each source is searched for the selected parameter.

Operation 406 is reached from operation 406 where, in operation 404, it is determined that there is a parameter remaining. Operation 406 depicts selecting a parameter. Where a list of parameters is maintained, as described in operation 404, operation 406 may comprise selecting the next un-examined parameter in the list. Similar operations may be performed where the collection of parameters are maintained via different data structures or techniques. After operation 406, the operations of FIG. 4 move to operation 408.

Operation 408 depicts determining whether there is a source remaining. Operation 408 may be performed in a similar manner as operation 404, but with multiple sources rather than multiple parameters. Multiple sources may comprise, for example, a structured relational database, as well as a collection of unstructured natural-language documents. Alternatively, there may be multiple structured relational databases and/or multiple collections of unstructured natural-language documents. Identifiers of each of these sources may be maintained, such as in a list similar to the list described in operation 404, and each source may be examined for each parameter.

If in operation 408 it is determined that there is a source remaining, the operations of FIG. 4 move to operation 410. Instead, where in operation 410 it is determined that there is not a source remaining, the operations of FIG. 4 return to operation 404.

It may be appreciated that operation 408 serves as the origin of a loop through the majority of the operations of FIG. 4 to search for numerical values for the parameter of an advection-diffusion model that is selected in operation 406. This search may be performed across multiple sources (and each search on a source may return multiple results for the parameter).

It may also be appreciated that there may be other approaches for searching for values for multiple parameters across multiple sources. For example, in some embodiments, each source is examined once, wherein each of the multiple parameters are searched for within that source substantially concurrently.

Operation 410 is reached from operation 408 where, in operation 408, it is determined whether there is a source remaining. Operation 410 depicts selecting a source. Operation 410 may be performed in a similar manner as operation 406, where in operation 410 it is a source that is selected whereas in operation 406 it is a parameter that is selected. After operation 410, the operations of FIG. 4 move to operation 412.

Operation 412 depicts searching the source on the parameter. Searching the source on the parameter may comprise performing a NLP search on the parameter to identify recitations of the parameter in the source (along with corresponding possible values for the parameter, as described with respect to operation 416). After operation 412, the operations of FIG. 4 move to operation 414.

Operation 414 depicts determining whether the parameter was found in the source. Where a search has been performed in operation 412, that search may return a set of results. Where that set of results identifies that the parameter was not found in the source, this may be interpreted in operation 414 as indicating that the parameter was not found in the source. Where that set of results identifies that the parameter was found in the source, this may be interpreted in operation 414 as of the parameter being found in the source.

If in operation 414 it is determined that the parameter was found within the source, then the operations of FIG. 4 move to operation 416. Instead, if in operation 414, it is determined that the parameter was not found within the source the operations of FIG. 4 return to operation 408.

Operation 416 is reached from operation 414 where, in operation 414, it is determined that there the parameter was found in the source. Operation 416 depicts determining whether a corresponding value for the parameter was found in the source. For example, determining whether a corresponding value for the parameter was found in the source may involve performing the search on the source (as described in operation 412) with a supervised structural classifier, such as a support vector machine (SVM), the results of which may identify whether such a corresponding value does exist for the parameter in the source.

Where in operation 416 it is determined that there is a corresponding numerical value found for the parameter, then the operations of FIG. 4 move to operation 418. Instead, where in operation 416 it is determined that there is not a corresponding numerical value found for the parameter, then the operations of FIG. 4 move to operation 408.

Operation 418 is reached from operation 416 where, in operation 416, it is determined that there is a numerical value within a predetermined distance from the parameter.

Operation 418 depicts determining whether the numerical value in conjunction with the parameter meet defined characteristics. These defined characteristics may include, for example, a geographical location to be used in the advection-diffusion model, a weather chemistry to be used in the advection-diffusion model, a grid resolution to be used in the advection-diffusion model, a climate to be used in the advection diffusion model, or a market volatility to be used in an advection-diffusion model.

In some embodiments, operation 418 may comprise selecting a first numerical value for a first parameter from a plurality of numerical values for the first parameter based on the first numerical value being associated with a similar characteristic as a characteristic being modeled with the advection-diffusion model.

If in operation 418 it is determined that the numerical value in conjunction with the parameter meets defined characteristics, then the operations of FIG. 4 move to operation 420. Instead, if in operation 418 it is determined that the numerical value in conjunction with the parameter does not meet defined characteristics, then the operations of FIG. 4 return to operation 408.

Operation 420 is reached from operation 418 upon determining that the numerical value in conjunction with the parameter meets defined characteristics. Operation 420 depicts storing an association between the parameter, the numerical value, and the source. In some embodiments, operation 420 may comprise storing this association between the parameter, the numerical value, and the source in a relational database, so that a search on the parameter returns a tuple of the parameter, the numerical value, and the source. After operation 420, the operations return to operation 408.

FIG. 5 illustrates an example process for determining a numerical value for a parameter that is to be used in initializing large-scale advection-diffusion models from among a plurality of numerical values. In some embodiments, the process of FIG. 5 may be implemented on the computer hardware of FIG. 1 to model advection-diffusion. It may be appreciated that the process of FIG. 5 is an example process, and that there may be embodiments that implement more or fewer operations than are depicted. It may also be appreciated that there may be embodiments that implement the process of FIG. 5 in a different order than they are depicted in FIG. 5.

The process of FIG. 5 begins with operation 502 and then move to operation 504. Operation 504 depicts determining whether there is a parameter remaining. Operation 504 may comprise, maintaining a list, or other data structure, or the parameters for which a value is to be selected, and traversing this list. If there is an unexamined parameter remaining in this list, it may be determined that there is a parameter remaining. However, if the end of the list has been reached, then it may be determined that there is not a parameter remaining. In this manner, a value may be determined for each parameter in initializing an advection-diffusion model.

If in operation 504 it is determined that there is a parameter remaining, then the process of FIG. 5 moves to operation 506. Instead, if in operation 504 it is determined that there is not a parameter remaining, then the process of FIG. 5 moves to operation 512, where the process of FIG. 5 ends.

Operation 506 is reached from operation 504 where, in operation 504, it is determined that there is a parameter remaining. Operation 506 depicts determining whether there are multiple values for a parameter. It may be that, in the course of performing a NLP search on multiple sources, multiple possible values for a single parameter have been found. Where these multiple possible values are stored, such as a tuple of (value, parameter, source) as described in operation 420 of FIG. 4, the tuples may be traversed, and where multiple tuples both identify the parameter, it may be determined that there are multiple values for the parameter to be considered.

If in operation 506 it is determined that there are multiple values for the parameter, then the process of FIG. 5 moves to operation 508. Instead, if in operation 506 it is determined that there are not multiple values for the parameter, then the process of FIG. 5 moves to operation 510.

Operation 508 is reached from operation 506 where, in operation 506, it is determined that there are multiple values for the parameter. Operation 508 depicts selecting a value for the parameter. In some embodiments, selecting a value for the parameter may comprise selecting the most-frequently occurring value of the multiple values (the mode of the multiple values). Selecting a value for the parameter in this fashion may be stated as, selecting a first numerical value for a first parameter based on the first numerical value for the parameter appearing more times in a plurality of documents than a second numerical value for the parameter appears in the plurality of documents.

In some embodiments, the significance of the document in which a possible value was found may be used to determine which value to use. For example, a document that has been heavily cited by other documents may be considered to have a greater authority on what the parameter's value should be, than other documents. In this case, the value may be selected based on the value appearing in a document that has been cited the most times among the documents in which a value for the parameter does appear. Selecting a value for the parameter in this fashion may be expressed as, selecting a first numerical value for a first parameter based on the first numerical value for the parameter appearing in a first document of a plurality of documents, there being more citations to the first document than citations to a second document of the plurality of documents, the second document including a second value for the parameter of the plurality of values for the parameter.

In some embodiments, the value may be selected from the multiple values based on a combination of multiple of these approaches (e.g., number of times a value appears, or number of citations to a document in which a value appears). After operation 508, the process of FIG. 5 returns to operation 504. In this manner, operations 504-510 may serve as a loop to determine a value for each parameter for an advection-diffusion model.

Operation 510 is reached from operation 506 upon determining, in operation 506, that multiple values for the parameter are not there. Operation 510 depicts using the sole value for the parameter as the value for the parameter. Using the sole value for the parameter may comprise initializing the advection-diffusion model with that value for the parameter.

In some embodiments, where no value has been determined for a parameter, operation 510 may comprise first determining whether there is a single value for the parameter or no value for the parameter. Then, when it is determined that there is no value for the parameter, operation 510 may comprise raising an error to alert a user of this situation and prompt the user for a value, initializing the model with a default value for the parameter, or determining a value for the parameter based on other characteristics of the model, such as values for other parameters that are known.

After operation 508, the process of FIG. 5 returns to operation 504. In this manner, operations 504-510 may serve as a loop to determine a value for each parameter for an advection-diffusion model.

Detailed embodiments of the claimed structures and methods are disclosed herein. However, it can be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible and/or non-transitory device that may retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD, alternatively known as a digital video disc), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as a Smalltalk or C++ programming language or the like, and conventional procedural programming languages, such as a C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an (ISP) Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure, and these illustrations may comprise one or more operations. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for determining a first numerical value for a first parameter of a computer-based advection-diffusion model, the method comprising:
  determining the first parameter for a computer-based advection-diffusion model for which the first numerical value is to be determined;
  performing a natural language processing (NLP) search for a plurality of numerical values for the first parameter on a plurality of documents;
  selecting the first numerical value for the first parameter from the plurality of numerical values for the first parameter, based on the first numerical value for the parameter appearing more times in the plurality of documents than a second numerical value for the parameter appearing in the plurality of documents;
  performing the advection-diffusion model using the first numerical value for the first parameter; and
  storing a result of performing the advection-diffusion model in a computer memory.

2. The computer-implemented method of claim 1, wherein a first document of the plurality of documents is an unstructured document.

3. The computer-implemented method of claim 2, wherein the unstructured document is a natural-language document.

4. The computer-implemented method of claim 1, wherein a first document of the plurality of documents comprises a structured document.

5. The computer-implemented method of claim 4, wherein the structured document comprises a relational database.

6. A computer-implemented method for determining a first numerical value for a first parameter of a computer-based advection-diffusion model, the method comprising:
  determining the first parameter for a computer-based advection-diffusion model for which the first numerical value is to be determined;
  performing a natural language processing (NLP) search for a plurality of numerical values for the first parameter on a plurality of documents;
  selecting the first numerical value for the first parameter from the plurality of numerical values for the first parameter based on the first numerical value for the parameter appearing in a first document of the plurality of documents, there being more citations to the first document than citations to a second document of the plurality of documents, the second document including a second value for the parameter of the plurality of values for the parameter;
  performing the advection-diffusion model using the first numerical value for the first parameter; and
  storing a result of performing the advection-diffusion model in a computer memory.

7. A computer system for determining a first numerical value for a first parameter of a computer-based advection-diffusion model, comprising:
  a processor, a computer-readable memory, a computer-readable tangible storage device, and program instructions stored on the storage device for execution by the processor via the memory, wherein execution of the program instructions by the computer system configures the computer system to:
    perform a natural language processing (NLP) search for a plurality of numerical values for the first parameter on a plurality of documents;
    select the first numerical value for the first parameter from the plurality of numerical values for the first parameter;
    perform the advection-diffusion model using the first numerical value for the first parameter; and
    halt performing the NLP search when a predetermined number of numerical values for the first parameter have been found.

8. The computer system of claim 7, wherein execution of the program instructions further configures the computer system to:
  select the first numerical value for the first parameter from the plurality of numerical values for the first parameter based on the first numerical value being associated with a similar geographical location as a geographical location being modeled with the advection-diffusion model.

9. The computer system of claim 7, wherein execution of the program instructions further configures the computer system to:
  select the first numerical value for the first parameter from the plurality of numerical values for the first parameter based on the first numerical value being associated with a similar weather chemistry as a weather chemistry being modeled with the advection-diffusion model.

10. The computer system of claim 7, wherein execution of the program instructions further configures the computer system to:
  select the first numerical value for the first parameter from the plurality of numerical values for the first parameter based on the first numerical value being associated with a similar grid resolution as a grid resolution being modeled with the advection-diffusion model.

11. The computer system of claim 7, wherein execution of the program instructions further configures the computer system to:
  select the first numerical value for the first parameter from the plurality of numerical values for the first parameter based on the first numerical value being associated with a similar climate as a climate being modeled with the advection-diffusion model.

12. The computer system of claim 7, wherein execution of the program instructions further configures the computer system to:
  select the first numerical value for the first parameter from the plurality of numerical values for the first parameter based on the first numerical value being associated with a similar market volatility as a market volatility being modeled with the advection-diffusion model.

13. A computer program product, comprising:
  a computer readable storage medium having programming instructions embodied therewith, the program instructions executable by a computer cause the computer to:

perform a natural language processing (NLP) search for a plurality of numerical values for a first parameter of an advection-diffusion model on a plurality of documents;

determine whether the plurality of numerical values are associated with the first parameter based on performing a statistical classification on the plurality of numerical values in the plurality of documents;

select a first numerical value for the first parameter from the plurality of numerical values for the first parameter; and perform the advection-diffusion model using the first numerical value for the first parameter.

14. The computer program product of claim 13, wherein the program instructions executable by the computer further cause the computer to:

access the plurality of documents that are stored on a remote computer and accessed via a communications network.

15. The computer program product of claim 13, wherein the program instructions executable by the computer further cause the computer to:

select the first numerical value for the first parameter from the plurality of numerical values for the first parameter based on the first numerical value for the parameter appearing more times in the plurality of documents than a second numerical value for the parameter appears in the plurality of documents, or based on the first numerical value for the parameter appearing in a first document of the plurality of documents, there being more citations to the first document than citations to a second document of the plurality of documents, the second document including a second value for the parameter of the plurality of values for the parameter.

16. The computer program product of claim 13, wherein the program instructions executable by the computer further cause the computer to:

store a result of performing the advection-diffusion model; and using the result of performing the advection-diffusion model to determine a second numerical value for a second parameter of a second advection-diffusion model.

17. The computer program product of claim 13, wherein the program instructions executable by the computer further cause the computer to:

before performing the NLP search, training a component that performs the search with labeled documents.

* * * * *